United States Patent
Hoshiba

(10) Patent No.: US 11,001,105 B2
(45) Date of Patent: May 11, 2021

(54) PNEUMATIC TIRE

(71) Applicant: The Yokohama Rubber Co., LTD., Tokyo (JP)

(72) Inventor: Takashi Hoshiba, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/322,877

(22) PCT Filed: Aug. 1, 2017

(86) PCT No.: PCT/JP2017/027885
§ 371 (c)(1),
(2) Date: Feb. 1, 2019

(87) PCT Pub. No.: WO2018/025854
PCT Pub. Date: Feb. 8, 2018

(65) Prior Publication Data
US 2019/0202247 A1    Jul. 4, 2019

(30) Foreign Application Priority Data
Aug. 2, 2016   (JP) .............................. JP2016-152174

(51) Int. Cl.
*B60C 19/00*   (2006.01)
*B60C 5/00*    (2006.01)

(52) U.S. Cl.
CPC .............. *B60C 19/002* (2013.01); *B60C 5/00* (2013.01)

(58) Field of Classification Search
CPC .................................................. B60C 19/002
See application file for complete search history.

(56) References Cited

U.S. PATENT DOCUMENTS

| | | | |
|---|---|---|---|
| 2005/0098251 A1 | 5/2005 | Yukawa | |
| 2005/0205183 A1 | 9/2005 | Yukawa | |
| 2006/0231185 A1 | 10/2006 | Tanno | |
| 2007/0119533 A1 | 5/2007 | Yukawa | |
| 2009/0277549 A1* | 11/2009 | Tanno | B60C 19/002 152/157 |

(Continued)

FOREIGN PATENT DOCUMENTS

| | | |
|---|---|---|
| JP | 2002-067608 | 3/2002 |
| JP | 2005-138760 | 6/2005 |

(Continued)

OTHER PUBLICATIONS

Machine Translation: JP-2013112062-A; Kubota, Yasuhiro; (Year: 2020).*

(Continued)

*Primary Examiner* — Kendra Ly
(74) *Attorney, Agent, or Firm* — Thorpe North & Western

(57) ABSTRACT

A pneumatic tire includes a carcass layer mounted between a pair of bead portions; a belt layer disposed on an outer circumferential side of the carcass layer; and a band-like sound absorbing member extending in a tire circumferential direction adhered to a region of a tire inner surface corresponding to a tread portion, the band-like sound absorbing member being locally disposed at a position distanced from a central region of the region corresponding to the tread portion, and an outer circumferential surface of the band-like sound absorbing member including cuts extending in the tire circumferential direction.

16 Claims, 8 Drawing Sheets

(56) References Cited

U.S. PATENT DOCUMENTS

| | | | |
|---|---|---|---|
| 2010/0270101 A1 | 10/2010 | Yukawa | |
| 2010/0294406 A1 | 11/2010 | Tanno | |
| 2015/0306922 A1* | 10/2015 | Kim | B60C 19/002 |
| | | | 152/157 |
| 2016/0339749 A1 | 11/2016 | Yukawa | |
| 2017/0008354 A1* | 1/2017 | Sakamoto | B60C 9/2204 |

FOREIGN PATENT DOCUMENTS

| | | | | |
|---|---|---|---|---|
| JP | 2005-262920 | | 9/2005 | |
| JP | 2006-341629 | | 12/2006 | |
| JP | 2008-254339 | | 10/2008 | |
| JP | 2010-269767 | | 12/2010 | |
| JP | 2013-112062 | | 6/2013 | |
| JP | 2013112062 A | * | 6/2013 | |
| JP | 2015-147544 | | 8/2015 | |
| WO | WO 2005/012007 | | 2/2005 | |
| WO | WO-2015111315 A1 | * | 7/2015 | B60C 19/002 |
| WO | WO 2015/118707 | | 8/2015 | |

OTHER PUBLICATIONS

International Search Report for International Application No. PCT/JP2017/027885 dated Sep. 12, 2017, 4 pages, Japan.

* cited by examiner

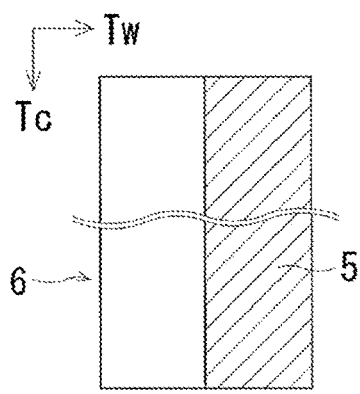
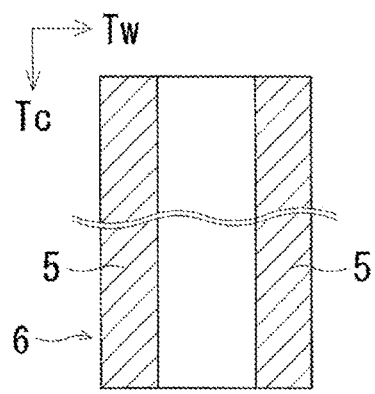
FIG. 8A    FIG. 8B
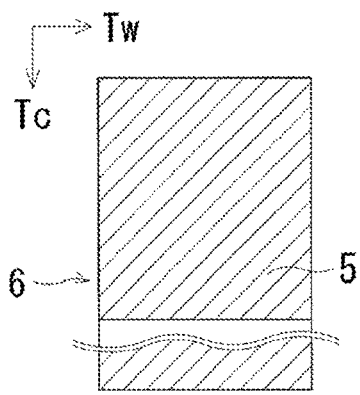
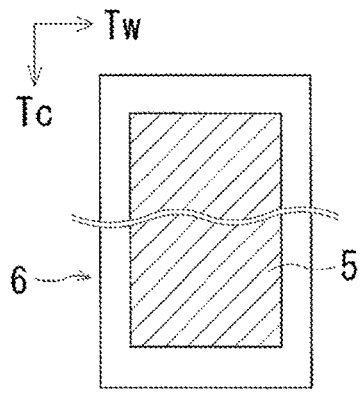
FIG. 8C    FIG. 8D
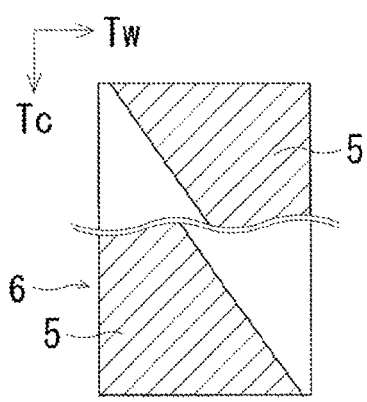
FIG. 8E

PNEUMATIC TIRE

TECHNICAL FIELD

The present technology relates to a pneumatic tire and particularly relates to a pneumatic tire with an advantageous placement position for a band-like sound absorbing member adhered to a tire inner surface that provides enhanced high-speed durability and band-like sound absorbing member adhesiveness via cuts in an outer circumferential surface of the band-like sound absorbing member.

BACKGROUND ART

One of the factors that generate tire noise is cavernous resonance caused by the vibration of the air in a tire cavity portion. This cavernous resonance occurs when a tread portion of a tire that contacts a road surface vibrates due to unevenness or the like of the road surface when a vehicle is driven, and this vibration vibrates the air in the tire cavity portion. A frequency range within the cavernous resonance corresponds to noise. Thus, reducing the noise level in this frequency range is vital to reducing tire noise.

An example of a known method for reducing noise due to this cavernous resonance phenomenon includes a method of directly adhering and fixing a band-like sound absorbing member to a tire inner surface (see, for example, Japan Unexamined Patent Publication Nos. 2002-67608 and 2005-138760). However, in this case, because the band-like sound absorbing member is directly adhered on the tire inner surface, heat accumulates in the tread portion. This accumulation of heat degrades high-speed durability. In particular, because the band-like sound absorbing member described above is disposed in a central region of the region of the tire inner surface that corresponds to the tread portion, the amount of heat accumulated in the central region when traveling is relatively large, making this accumulation of heat likely to reduce high-speed durability.

Additionally, in a configuration in which the band-like sound absorbing member is directly adhered to the tire inner surface, deformation of the tire strains the band-like sound absorbing member. This strain makes the band-like sound absorbing member likely to peel off.

SUMMARY

The present technology provides a pneumatic tire with an advantageous placement position for a band-like sound absorbing member adhered to a tire inner surface that provides enhanced high-speed durability and band-like sound absorbing member adhesiveness via cuts in an outer circumferential surface of the band-like sound absorbing member.

A pneumatic tire according to an embodiment of the present technology, includes:
a carcass layer mounted between a pair of bead portions;
a belt layer disposed on an outer circumferential side of the carcass layer; and
a band-like sound absorbing member extending in a tire circumferential direction adhered to a region of a tire inner surface corresponding to a tread portion,
the band-like sound absorbing member being locally disposed at a position distanced from a central region of the region corresponding to the tread portion, and
an outer circumferential surface of the band-like sound absorbing member including cuts extending in the tire circumferential direction.

In an embodiment of the present technology, the band-like sound absorbing member is locally disposed at a position distanced from the central region of the region corresponding to the tread portion. This allows the accumulation of heat at the tread portion to be prevented, and high-speed durability to be improved while maintain sound absorbing effects. Accordingly, quietness and durability can be provided. In a configuration in which the band-like sound absorbing member is disposed in the shoulder region, when the tire rolls, a great strain is produced in the band-like sound absorbing member in the tire lateral direction. However, because the cuts extending in the tire circumferential direction are formed in the outer circumferential surface of the band-like sound absorbing member, the band-like sound absorbing member deforms in accordance with the tire deformation. Thus, the tension in the band-like sound absorbing member can be alleviated and the adhesiveness between the band-like sound absorbing member and the tire inner surface can be improved.

In an embodiment of the present technology, preferably an angle $\theta$ of the cuts with respect to the tire circumferential direction is in a range $0° \leq \theta \leq 40°$. The angle $\theta$ of the cuts with respect to the tire circumferential direction is more preferably closer to $0°$. In this way, when the tire is inflated and grows in diameter, the cuts of the band-like sound absorbing member open and the band-like sound absorbing member deforms in accordance with the tire deformation. This alleviates the tension in the band-like sound absorbing member and allows the adhesiveness between the band-like sound absorbing member and the tire inner surface to be improved.

In an embodiment of the present technology, preferably, a depth d of the cuts is 20% or greater of a thickness D of the band-like sound absorbing member. In this way, when the tire is inflated and grows in diameter, the cuts of the band-like sound absorbing member open and the band-like sound absorbing member deforms in accordance with the tire deformation. This alleviates the tension in the band-like sound absorbing member and allows the adhesiveness between the band-like sound absorbing member and the tire inner surface to be improved.

In an embodiment of the present technology, preferably, an outer end in a tire lateral direction of the outer circumferential surface of the band-like sound absorbing member is disposed outward from a belt end portion of the belt layer in the tire lateral direction. By disposing the band-like sound absorbing member at or near the belt end portion of the belt layer, an effect of enhancing high-speed durability can be sufficiently ensured. However, the region at or near the belt end portion deforms greatly and tension acts on the band-like sound absorbing member in the tire lateral direction. Thus, the band-like sound absorbing member is likely to peel off. However, cuts extending in the tire circumferential direction are disposed in the outer circumferential surface of the band-like sound absorbing member. This can alleviate the strain caused by tire deformation and allows adhesiveness between the band-like sound absorbing member and the tire inner surface to be effectively enhanced.

In an embodiment of the present technology, preferably, a distance a from the outer end of the outer circumferential surface of the band-like sound absorbing member in the tire lateral direction to the belt end portion is 10% or less of a belt width Wb of the belt layer. The band-like sound absorbing member becomes more likely to peel off to further outward from the belt end portion in the tire lateral direction. Thus, by disposed in the band-like sound absorbing member in this manner, the adhesiveness between the band-like sound absorbing member and the tire inner surface can be effectively enhanced.

In an embodiment of the present technology, preferably, a width Wk of a region where the cuts are disposed in the band-like sound absorbing member is 80% or less of a width Ws of the band-like sound absorbing member with an outer end of the band-like sound absorbing member in a tire lateral direction as a reference point. Additionally, the width Wk is preferably 20% or greater of the width Ws and more preferably 50% or greater. In this way, by enhancing the adhesiveness between the band-like sound absorbing member and the tire inner surface, the work of disposing the cuts can be kept to a minimum and productivity is effectively improved.

In an embodiment of the present technology, preferably, an adhesion area between the band-like sound absorbing member and the tire inner surface is 50% or greater of an area of the outer circumferential surface of the band-like sound absorbing member. In this way, the adhesiveness between the band-like sound absorbing member and the tire inner surface can be sufficiently ensured.

In an embodiment of the present technology, preferably, the band-like sound absorbing member is disposed in shoulder regions on both sides of the tread portion. In this way, the sound absorbing effect from the band-like sound absorbing member can be sufficiently obtained.

In an embodiment of the present technology, preferably, a volume of the band-like sound absorbing member is from 10% to 40% of a cavity volume of the pneumatic tire. In this way, the sound absorbing effect from the band-like sound absorbing member can be further obtained. By increasing the volume of the band-like sound absorbing member in this manner an excellent noise reduction effect can be obtained, and moreover a good tension alleviation effect and heat dissipation effect can be achieved, even with a large band-like sound absorbing member. The cavity volume of the pneumatic tire is the volume of the cavity portion formed between the tire and the rim when the tire is mounted on a regular rim and inflated to the regular internal pressure. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (Tire and Rim Association, Inc.), and refers to a "measuring rim" in the case of ETRTO (European Tyre and Rim Technical Organisation). However, when the tire is an original equipment tire, the volume of the space is calculated using a genuine wheel to which the tire is assembled. "Regular internal pressure" is an air pressure defined by standards for each tire according to a system of standards that includes standards on which tires are based, and refers to a "maximum air pressure" in the case of JATMA, refers to the maximum value in the table of "TIRE LOAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

In an embodiment of the present technology, the band-like sound absorbing member preferably has a missing portion at least one position in the tire circumferential direction. This configuration allows the expansion of the tire during inflation and/or shear strain of the adhering surface due to rolling on ground to be tolerated for a long period of time.

BRIEF DESCRIPTION OF DRAWINGS

FIGS. 8A to 8E are developed views of pneumatic tires according to modified examples of the present technology each illustrating a portion of an adhering surface side of a band-like sound absorbing member adhered on an inner surface of the pneumatic tire.

DETAILED DESCRIPTION

Figure 1:
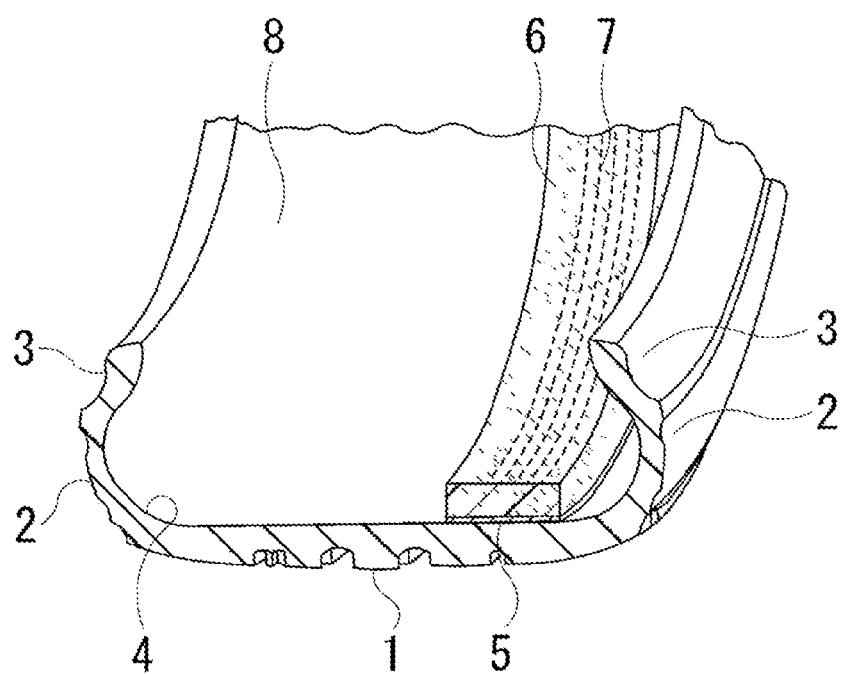
FIG. 1 is a perspective cross-sectional view of an example of a pneumatic tire according to an embodiment of the present technology.
Figure 2:
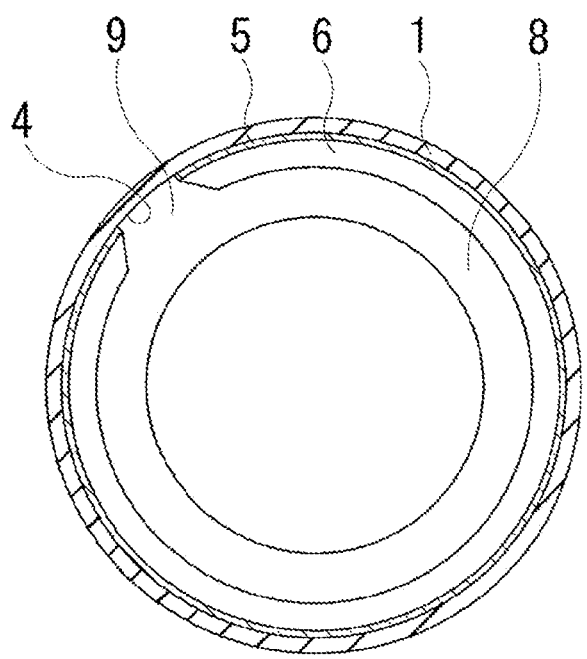
FIG. 2 is a cross-sectional view taken along the equator line of an example of a pneumatic tire according to an embodiment of the present technology.
Figure 3:
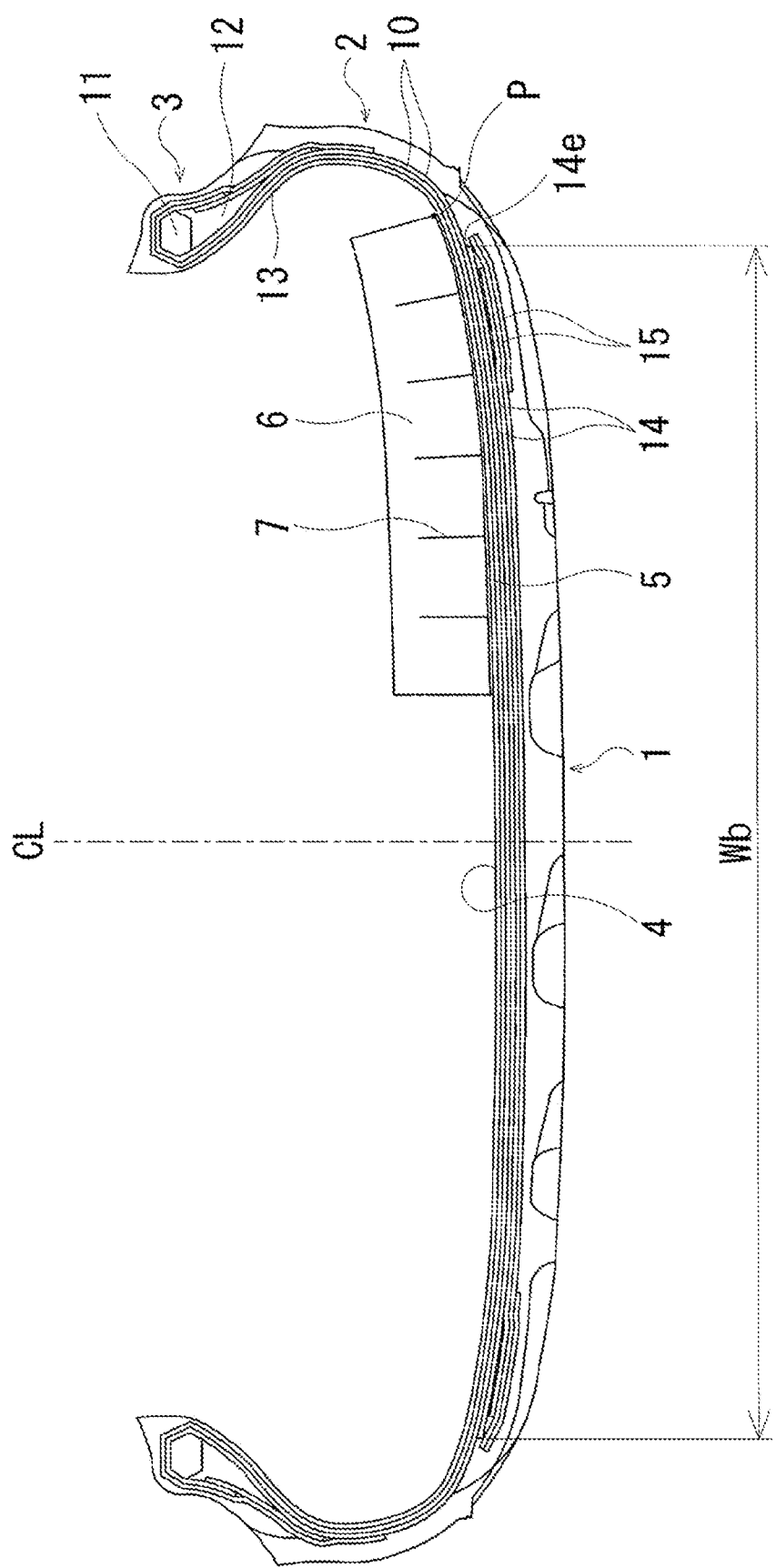
FIG. 3 is a meridian cross-sectional view illustrating an example of a pneumatic tire according to an embodiment of the present technology.

Configuration of embodiments of the present technology are described in detail below with reference to the accompanying drawings. FIGS. 1 to 3 illustrate an example of a pneumatic tire according to an embodiment of the present technology.

As illustrated in FIGS. 1 and 2, the pneumatic tire according to the present embodiment includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction.

In the pneumatic tire described above, a band-like sound absorbing member 6 is locally adhered along the tire circumferential direction in a region of a tire inner surface 4 corresponding to the tread portion 1, via an adhesive layer 5. The band-like sound absorbing member 6 is formed from a porous material with open cells, and has predetermined sound absorbing properties based on the porous structure. Polyurethane foam is preferably used as the porous material of the band-like sound absorbing member 6. A double-sided adhesive tape is preferably used as the adhesive layer 5.

As illustrated in FIG. 3, at least one carcass layer 10 (two in FIG. 3) is mounted between the pair of bead portions 3, 3. The carcass layer 10 includes carcass cords oriented in the tire radial direction. Organic fiber cords are preferably used as the carcass cords. The carcass layer 10 is turned up around a bead core 11 disposed in each of the bead portions 3 from the tire inner side to the tire outer side. A bead filler 12 with a triangular cross-sectional shape is disposed on the tire outer circumferential side of each of the bead cores 11. Furthermore, an innerliner layer 13 is disposed in a region between the pair of bead portions 3, 3 on a tire inner surface.

In the tread portion 1, belt layers 14 (two layers in FIG. 3) are embedded in the tire outer circumferential side of the carcass layer 10. These belt layers 14 each include reinforcing cords that are inclined with respect to the tire circumferential direction with the reinforcing cords of the different layers arranged in a criss-cross manner. In the belt layers 14, an inclination angle of the reinforcing cords with respect to the tire circumferential direction ranges from, for example, 10° to 40°. Steel cords are preferably used as the reinforcing cords of the belt layers 14. To improve high-speed durability, at least one belt cover layer 15, in which the reinforcing cords are arranged at an angle of 5° or less with respect to the tire circumferential direction, is disposed on the tire outer circumferential side of the belt layers 14. The belt cover layer 15 preferably has a jointless structure in which a strip material made from at least one reinforcing cord aligned and covered with rubber is wound continuously in the tire circumferential direction. Also, the belt cover layer 15 can be disposed so as to completely cover the belt layers 14 in the width direction, or can be disposed to cover only the outer edge portions of the belt layers 14 in the width direction. Organic fiber cords of nylon, aramid, or the like are preferably used as the reinforcing cords of the belt cover layer 15.

Cuts 7 are formed in the outer circumferential surface of the band-like sound absorbing member 6, i.e., the adhering surface to the tire inner surface 4. The cuts 7 extend in the tire circumferential direction. The cuts 7 open only to the outer circumferential surface of the band-like sound absorbing member 6 and do not open to the inner circumferential surface of the band-like sound absorbing member 6. In the aspect illustrated in FIGS. 1 and 3, the band-like sound absorbing member 6 is disposed in the left or right shoulder region of the region of the tire inner surface 4 corresponding to the tread portion 1. However, in another aspect, the band-like sound absorbing member 6 may be disposed in both the left and right shoulder regions. Quietness can be improved by disposing the band-like sound absorbing member 6 in both the left and right shoulder regions. However, the band-like sound absorbing member 6 is not disposed straddling a tire center line CL and is locally disposed at a position distanced from the central region of the tread portion 1.

In the pneumatic tire described above, the band-like sound absorbing member 6 is locally disposed at a position distanced from the central region of the region corresponding to the tread portion 1. This allows the accumulation of heat at the tread portion 1 to be prevented, and high-speed durability to be improved while maintain sound absorbing effects. Accordingly, quietness and durability can be provided. In a configuration in which the band-like sound absorbing member 6 is disposed in the shoulder region, when the tire rolls, a great strain is produced in the band-like sound absorbing member 6 in the tire lateral direction. However, because the cuts 7 extending in the tire circumferential direction are formed in the outer circumferential surface of the band-like sound absorbing member 6, the band-like sound absorbing member 6 deforms in accordance with the tire deformation. Thus, the tension in the band-like sound absorbing member 6 can be alleviated and the adhesiveness between the band-like sound absorbing member 6 and the tire inner surface 4 can be improved.

As illustrated in FIG. 3, an outer end in the tire lateral direction of the outer circumferential surface of the band-like sound absorbing member 6 corresponds to an outer end P. An end portion of the belt layer 14 with the maximum width, belt width Wb, corresponds to a belt end portion 14e.

The outer end P of the band-like sound absorbing member 6 is preferably disposed outward of the belt end portion 14e of the belt layer 14 in the tire lateral direction. By disposing the band-like sound absorbing member 6 at or near the belt end portion 14e of the belt layer 14, an effect of enhancing high-speed durability can be sufficiently ensured. However, the region at or near the belt end portion 14e deforms greatly and tension acts on the band-like sound absorbing member 6 in the tire lateral direction. Thus, the band-like sound absorbing member 6 is likely to peel off. However, cuts 7 extending in the tire circumferential direction are disposed in the outer circumferential surface of the band-like sound absorbing member 6. This can alleviate the strain caused by tire deformation and allows adhesiveness between the band-like sound absorbing member 6 and the tire inner surface 4 to be effectively enhanced.

Figure 4:
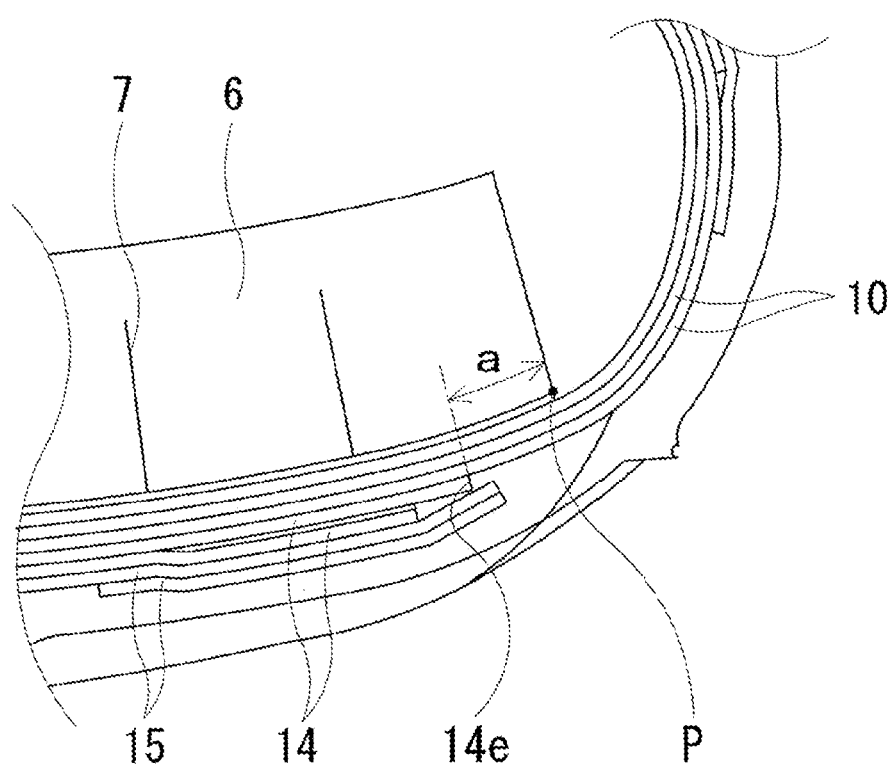
FIG. 4 is a cross-sectional view illustrating an enlarged view of a portion of the pneumatic tire of FIG. 3.

As illustrated in FIG. 4, the distance from the outer end P of the band-like sound absorbing member 6 to the belt end portion 14e corresponds to a distance a. The distance a is the length measured along the tire inner surface 4. The outer end P of the band-like sound absorbing member 6 is preferably located outward of the belt end portion 14e of the belt layer 14 in the tire lateral direction, and the distance a is preferably 10% or less of the belt width Wb of the belt layer 14. The band-like sound absorbing member 6 becomes more likely to peel off to further outward from the belt end portion 14e in the tire lateral direction. Thus, by disposed in the band-like sound absorbing member 6 in this manner, the adhesiveness between the band-like sound absorbing member 6 and the tire inner surface 4 can be effectively enhanced. Here, in a configuration in which the distance a is greater than 10% of the belt width Wb and the outer end P of the band-like sound absorbing member 6 is disposed on the outer side in the tire lateral direction, the band-like sound absorbing member 6 is disposed straddling a buttress portion, which deforms greatly. Thus, the band-like sound absorbing member 6 cannot deform in accordance with the tire deformation and peels off.

Figure 5:
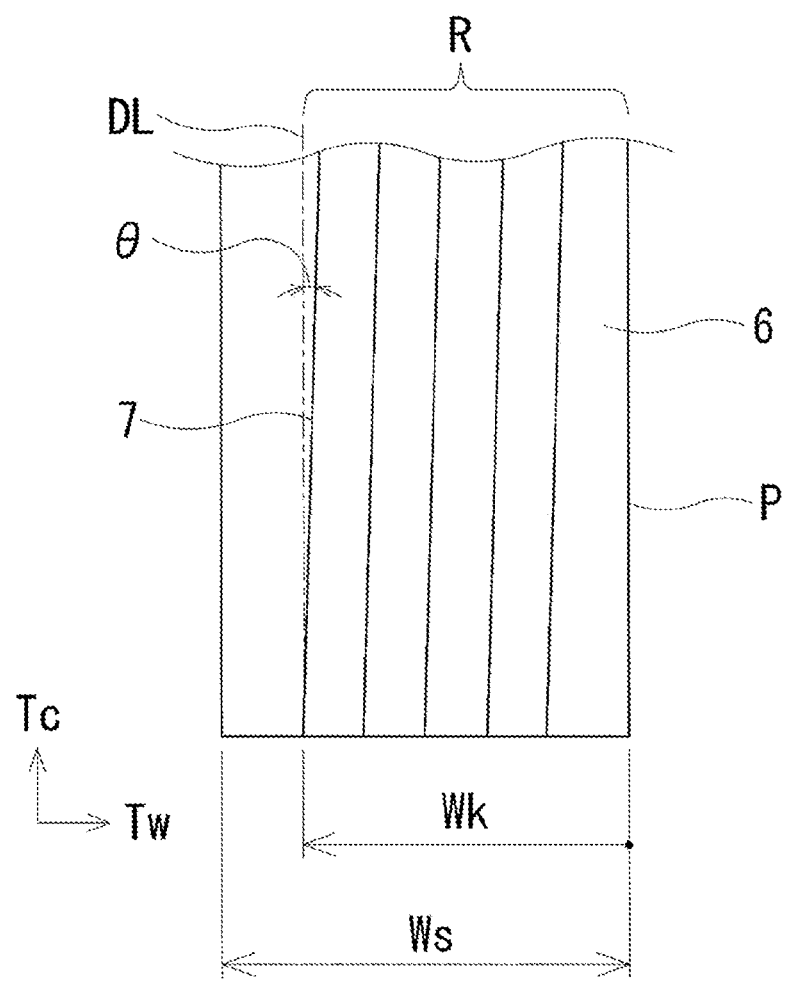
FIG. 5 is a developed view illustrating a portion of an adhering surface side of a band-like sound absorbing member adhered to the inner surface of a pneumatic tire according to an embodiment of the present technology.

As illustrated in FIG. 5, the angle of the cuts 7 with respect to the tire circumferential direction corresponds to an angle θ. Tc denotes the tire circumferential direction, and Tw denotes the tire lateral direction. The angle θ of the cuts 7 with respect to the tire circumferential direction is in the range 0°≤θ≤40°. The angle θ of the cuts 7 with respect to the tire circumferential direction is more preferably closer to 0°. By appropriately setting the angle θ in this manner, when the tire is inflated and grows in diameter, the cuts 7 of the band-like sound absorbing member 6 open and the band-like sound absorbing member 6 deforms in accordance with the tire deformation. This alleviates the tension in the band-like sound absorbing member 6 and allows the adhesiveness between the band-like sound absorbing member 6 and the tire inner surface 4 to be improved.

Additionally, in regard to the adhering surface between the band-like sound absorbing member 6 and the tire inner surface 4, the region where the cuts 7 are disposed corresponds to a region R. In other words, the region R is the region between a dot-dash line DL, extending in the tire circumferential direction with the end portion of the cuts 7 located furthest inward in the tire lateral direction as the reference point, and the outer end P of the band-like sound absorbing member 6. The width of the region R with the outer end P of the band-like sound absorbing member 6 as the reference point corresponds to a width Wk, and the width of the band-like sound absorbing member 6 corresponds to a width Ws. Defined as such, the width Wk of the region R is preferably 80% or less of the width Ws of the band-like sound absorbing member 6. Specifically, the width Wk is preferably 20% or greater of the width Ws and more preferably 50% or greater. To enhance the adhesiveness between the band-like sound absorbing member 6 and the tire inner surface 4, the width Wk is appropriately set in this manner with respect to the width Ws. This allows the work of disposing the cuts 7 to be kept to a minimum and is effective in improving productivity.

In an embodiment of the present technology, the adhesion area between the band-like sound absorbing member 6 and the tire inner surface 4, i.e., the placement area of the adhesive layer 5, is preferably 50% or greater of the area of the outer circumferential surface of the band-like sound absorbing member 6. By setting the adhesion area between the band-like sound absorbing member 6 and the tire inner surface 4 in such a manner, the adhesiveness between the band-like sound absorbing member 6 and the tire inner surface 4 can be sufficiently ensured. When the adhesion area is 50% or less, the adhesiveness between the band-like sound absorbing member 6 and the tire inner surface 4 is reduced, leading to the band-like sound absorbing member 6 peeling off.

Figure 6:
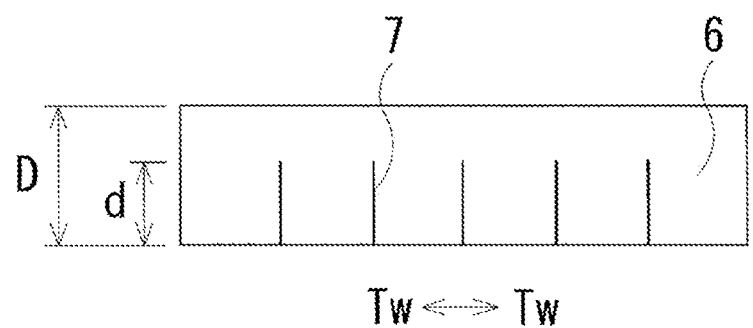
FIG. 6 is a cross-sectional view in the tire lateral direction of the sound absorbing member of FIG. 5.

FIG. 6 is a cross-sectional view in the tire lateral direction of the band-like sound absorbing member 6. The depth of the cuts 7 corresponds to a depth d, and the thickness of the band-like sound absorbing member 6 corresponds to a thickness D. The thickness D of the band-like sound absorbing member 6 generally has a suitable range of from 5 mm to 50 mm. When set as such, the depth d of the cuts 7 preferably ranges from 20% to 90% of the thickness D of the band-like sound absorbing member 6. By setting the depth d to an appropriate value with respect to the thickness D, the band-like sound absorbing member 6 can deform in accordance with the tire deformation and the tension in the band-like sound absorbing member 6 can be alleviated. This allows the adhesiveness between the band-like sound absorbing member 6 and the tire inner surface 4 to be improved. When the depth d of the cuts 7 is too shallow, the band-like sound absorbing member 6 cannot deform in accordance with the tire deformation and the effect of enhancing the adhesiveness between the band-like sound absorbing member 6 and the tire inner surface 4 is reduced.

In the pneumatic tire described above, the volume of the band-like sound absorbing member 6 ranges from 10% to 40% of the cavity volume of the tire. Additionally, the width of the band-like sound absorbing member 6 ranges from 30% to 90% of the tire ground contact width. By appropriately setting the volume and the width of the band-like sound absorbing member 6 in such a manner, the sound absorbing effect of the band-like sound absorbing member 6 can be achieved at a greater level. When the volume of the band-like sound absorbing member 6 is less than 10% of the cavity volume of the tire, the sound absorbing effect cannot be sufficiently achieved. When the volume of the band-like sound absorbing member 6 is greater than 40% of the cavity volume of the tire, the reduction effect of the noise caused by the cavernous resonance phenomenon is unchanged and further reduction effects are unachievable.

Additionally, as illustrated in FIG. 2, the band-like sound absorbing member 6 includes a missing portion 9 at one section in the tire circumferential direction. "Missing portion 9" is a portion along the tire circumference where the band-like sound absorbing member 6 is not present. Because the band-like sound absorbing member 6 includes the missing portion 9, the shear strain of the adhering surface caused by expansion when the tire is inflated can be endured for a long period of time, and the shear strain of band-like sound absorbing member 6 at the adhering surface can be effectively alleviated. The missing portion 9 provided along the tire circumference as described above preferably numbers one or from three to five. That is, when the missing portion 9 is provided at two sections along the tire circumference, tire uniformity due to mass unbalance significantly deteriorates, and when the missing portion 9 is provided at six or more positions along the tire circumference, production cost significantly increases.

Note that in a configuration in which the missing portion 9 is provided at two or more sections along the tire circumference, the band-like sound absorbing member 6 is broken in the tire circumferential direction. In such a configuration, for example, by the band-like sound absorbing members 6 being joined by a layered object such as the adhesive layer 5 made of double-sided adhesive tape, the band-like sound absorbing member 6 can be treated as an integral member, allowing the work of attaching the band-like sound absorbing member 6 to the tire inner surface 4 to be simplified.

Figure 7A:
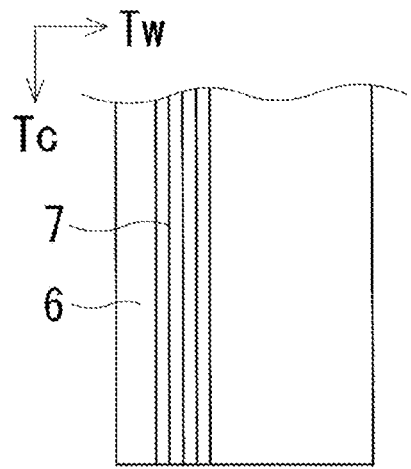
FIGS. 7A to 7D are developed views of pneumatic tires according to modified examples of the present technology each illustrating cuts in a portion of an adhering surface side of a band-like sound absorbing member adhered on an inner surface of the pneumatic tire.
Figure 7B:
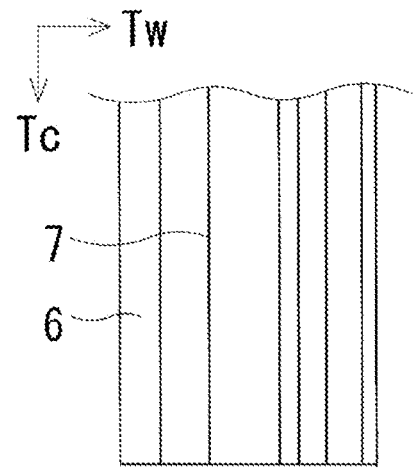
Figure 7C:
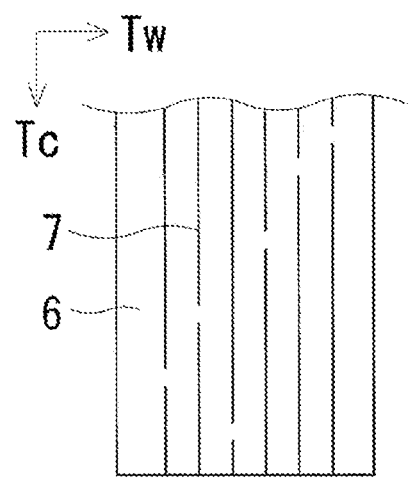
Figure 7D:
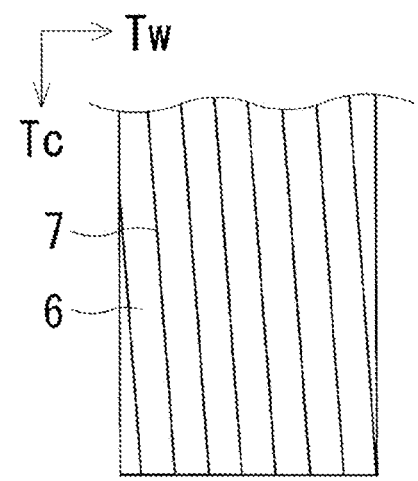

The cuts 7 may be disposed evenly all across the band-like sound absorbing member 6 as illustrated in FIGS. 1 and 3, and may also be disposed as illustrated in FIGS. 7A, 7B, 7C, and 7D. In FIG. 7A, the cuts 7 are disposed to one side of the band-like sound absorbing member 6 in the width direction. In FIG. 7B, the cuts 7 are disposed in the band-like sound absorbing member 6 in a random manner in the width direction. In FIG. 7C, the cuts 7 include a broken portion in the circumferential direction. In FIG. 7D, the cuts 7 are inclined with respect to the circumferential direction of the band-like sound absorbing member 6.

Additionally, in regard to the adhering surface between the band-like sound absorbing member 6 and the tire inner surface 4, the adhesive layer 5 may be disposed across all of the band-like sound absorbing member 6. Other examples include the adhesive layer 5 extending on one side of the band-like sound absorbing member 6 in the width direction as illustrated in FIG. 8A, and the adhesive layer 5 extending on both sides of the band-like sound absorbing member 6 in the width direction as illustrated in FIG. 8B. Other examples include the adhesive layer 5 being disposed at both end portions of the band-like sound absorbing member 6 in the circumferential direction as illustrated in FIG. 8C, the adhesive layer 5 being centrally disposed on the band-like sound absorbing member 6 as illustrated in FIG. 8D, and the adhesive layer 5 being disposed in opposite corner portions of the band-like sound absorbing member 6 as illustrated in FIG. 8E. Note that in the configurations illustrated in FIGS. 8A to 8E, the placement area of the adhesive layer 5 (hatched portion in the drawings) is 50% or greater of the area of the outer circumferential surface of the band-like sound absorbing member 6.

Examples

Tires according to Comparative Examples 1 and 2 and according to Examples 1 to 9 were manufactured. The tires have a tire size of 275/34ZR20 and include a carcass layer mounted between a pair of bead portions and a belt layer disposed on the outer circumferential side of the carcass layer, with a band-like sound absorbing member extending in the tire circumferential direction adhered in a region of a tire inner surface corresponding to a tread portion. Also the tires are set according to Tables 1 and 2 for the following: placement position of band-like sound absorbing member, presence/absence of cuts, angle θ of cuts with respect to the tire circumferential direction, ratio of depth d of cuts to thickness D of band-like sound absorbing member (d/D×

100%), and ratio of distance a from outer end of band-like sound absorbing member to belt end portion to belt width Wb (a/Wb×100%).

Note that in Tables 1 and 2, the value of the ratio of distance a from outer end of band-like sound absorbing member to the belt end portion to belt width Wb (a/Wb× 100%) is positive when the outer end of the band-like sound absorbing member is disposed outward from the belt end portion in the tire lateral direction and negative when disposed inward in the tire lateral direction.

The high-speed durability and adhesiveness of the band-like sound absorbing member were evaluated for these test tires according to the following test methods, and the results thereof are shown in Tables 1 and 2.

High-Speed Durability:

The test tires were mounted on wheels having a rim size of 20×9 1/2J, and subjected to a running test on a drum testing machine at an air pressure of 360 kPa and a load of 5 kN. Specifically, the initial speed was set to 250 km/h, and the speed was increased by 10 km/h every 20 minutes until tire failure to measure the step (speed) reached. Greater steps (speeds) reached indicate superior high-speed durability for the tire.

Adhesiveness of Band-Like Sound Absorbing Member:

The test tires were mounted on wheels having a rim size of 20×9 1/2J, and subjected to a running test on a drum testing machine at a running speed of 80 km/h, an air pressure of 160 kPa, a load of 8.5 kN, and running distance of 6480 km, after which the condition of the band-like sound absorbing member was visually confirmed. "Excellent" was graded when the band-like sound absorbing member did not fall off and did not fail, "Good" was graded when the adhering surface peeled off or the band-like sound absorbing member failed in an area less than ⅛ that of the entire band-like sound absorbing member, "Fair" was graded when the adhering surface peeled of or the band-like sound absorbing member failed in an area ⅛ or greater and less than ¼ that of the entire band-like sound absorbing member, and "Poor" was graded when the adhering surface peeled off or the band-like sound absorbing member failed in an area equal to or greater than ¼ that of the entire band-like sound absorbing member.

TABLE 1

|  | Comparative Example 1 | Comparative Example 2 | Example 1 | Example 2 | Example 3 | Example 4 |
| --- | --- | --- | --- | --- | --- | --- |
| Placement position of band-like sound absorbing member | Central region | Belt end portion | Belt end portion | Belt end portion | Belt end portion | Belt end portion |
| Cuts provided? | No | No | Yes | Yes | Yes | Yes |
| Angle θ of cuts with respect to the tire circumferential direction | 50° | 50° | 50° | 40° | 20° | 0° |
| Ratio of depth d of cuts to thickness D of band-like sound absorbing member (d/D × 100%) | 10% | 10% | 10% | 10% | 10% | 10% |
| Ratio of distance a from outer end of band-like sound absorbing member to belt end portion to belt width Wb (a/Wb × 100%) | −30% | 15% | 15% | 15% | 15% | 15% |
| High-speed durability | 310 km/h | 320 km/h | 320 km/h | 320 km/h | 320 km/h | 320 km/h |
| Adhesiveness of band-like sound absorbing member | Fair | Poor | Good | Excellent | Excellent | Excellent |

TABLE 2

|  | Example 5 | Example 6 | Example 7 | Example 8 | Example 9 |
| --- | --- | --- | --- | --- | --- |
| Placement position of band-like sound absorbing member | Belt end portion | Belt end portion | Belt end portion | Belt end portion | Belt end portion |
| Cuts provided? | Yes | Yes | Yes | Yes | Yes |
| Angle θ of cuts with respect to the tire circumferential direction | 0° | 0° | 0° | 0° | 0° |
| Ratio of depth d of cuts to thickness D of band-like sound absorbing member (d/D × 100%) | 20% | 50% | 90% | 20% | 20% |
| Ratio of distance a from outer end of band-like sound absorbing member to belt end portion to belt width Wb (a/Wb × 100%) | 15% | 15% | 15% | 20% | 10% |
| High-speed durability | 320 km/h | 320 km/h | 320 km/h | 320 km/h | 320 km/h |
| Adhesiveness of band-like sound absorbing member | Excellent | Excellent | Excellent | Good | Excellent |

As can be seen from Tables 1 and 2, the pneumatic tires according to Examples 1 to 9 have enhanced high-speed durability and adhesiveness of band-like sound absorbing member compared to that of Comparative Example 1.

In Comparative Example 1, the band-like sound absorbing member is disposed in the central region of the tread portion. Thus, high-speed durability is reduced and the effect of enhancing adhesiveness of band-like sound absorbing member cannot be sufficiently obtained. Additionally, in Comparative Example 2, cuts extending in the tire circumferential direction are not provided in the band-like sound absorbing member. Thus, adhesiveness of band-like sound absorbing member is degraded.

The invention claimed is:

1. A pneumatic tire, comprising:
a carcass layer mounted between a pair of bead portions;
a belt layer disposed on an outer circumferential side of the carcass layer; and
a band shaped sound absorbing member extending in a tire circumferential direction adhered to a region of a tire inner surface corresponding to a tread portion,
the band shaped sound absorbing member being locally disposed at a position distanced from a central region of the region corresponding to the tread portion, and
an outer circumferential surface of the band shaped sound absorbing member comprising cuts extending in the tire circumferential direction,
wherein a width Wk of a region where the cuts are disposed in the band shaped sound absorbing member is 75% or less of a width Ws of the band shaped sound absorbing member with an outer end of the band shaped sound absorbing member in a tire lateral direction as a reference point, wherein
the cuts have a closed state which transitions to an open state at a time of rolling of the pneumatic tire.

2. The pneumatic tire according to claim 1, wherein a depth d of the cuts is from 20% to 90% of a thickness D of the band shaped sound absorbing member.

3. The pneumatic tire according to claim 1, wherein an outer end of the outer circumferential surface of the band shaped sound absorbing member in a tire lateral direction is disposed outward from a belt end portion of the belt layer in the tire lateral direction.

4. The pneumatic tire according to claim 3, wherein a distance a from the outer end of the outer circumferential surface of the band shaped sound absorbing member in the tire lateral direction to the belt end portion is 10% or less of a belt width Wb of the belt layer.

5. The pneumatic tire according to claim 1, wherein an adhesion area between the band shaped sound absorbing member and the tire inner surface is 50% or greater of an area of the outer circumferential surface of the band shaped sound absorbing member.

6. The pneumatic tire according to claim 1, wherein the band shaped sound absorbing member is disposed in shoulder regions on both sides of the tread portion.

7. The pneumatic tire according to claim 1, wherein a volume of the band shaped sound absorbing member is from 10% to 40% of a cavity volume of the tire.

8. The pneumatic tire according to claim 1, wherein the band shaped sound absorbing member comprises a missing portion at least one section in the tire circumferential direction.

9. The pneumatic tire according to claim 1, wherein an angle $\theta$ of the cuts with respect to the tire circumferential direction is in a range $0° \leq \theta \leq 40°$.

10. The pneumatic tire according to claim 9, wherein a depth d of the cuts is from 20% to 90% of a thickness D of the band shaped sound absorbing member.

11. The pneumatic tire according to claim 10, wherein an outer end of the outer circumferential surface of the band shaped sound absorbing member in a tire lateral direction is disposed outward from a belt end portion of the belt layer in the tire lateral direction.

12. The pneumatic tire according to claim 11, wherein a distance a from the outer end of the outer circumferential surface of the band shaped sound absorbing member in the tire lateral direction to the belt end portion is 10% or less of a belt width Wb of the belt layer.

13. The pneumatic tire according to claim 12, wherein an adhesion area between the band shaped sound absorbing member and the tire inner surface is 50% or greater of an area of the outer circumferential surface of the band shaped sound absorbing member.

14. The pneumatic tire according to claim 13, wherein the band shaped sound absorbing member is disposed in shoulder regions on both sides of the tread portion.

15. The pneumatic tire according to claim 14, wherein a volume of the band shaped sound absorbing member is from 10% to 40% of a cavity volume of the pneumatic tire.

16. The pneumatic tire according to claim 15, wherein the band shaped sound absorbing member comprises a missing portion at least one section in the tire circumferential direction.

* * * * *